United States Patent [19]

Nishihara

[11] Patent Number: 4,977,480

[45] Date of Patent: Dec. 11, 1990

[54] VARIABLE-CAPACITANCE TYPE SENSOR AND VARIABLE-CAPACITANCE TYPE SENSOR SYSTEM USING THE SAME

[75] Inventor: Toshihiko Nishihara, Yokohama, Japan

[73] Assignee: Fuji Koki Mfg. Co., Ltd., Tokyo, Japan

[21] Appl. No.: 406,960

[22] Filed: Sep. 13, 1989

[30] Foreign Application Priority Data

Sep. 14, 1988 [JP] Japan ................. 63-230983
Dec. 24, 1988 [JP] Japan ................. 63-326455

[51] Int. Cl.⁵ .......................... H01G 7/00; G01L 9/12
[52] U.S. Cl. ........................................ 361/283; 73/724
[58] Field of Search ................. 73/701, 718, 724; 361/283

[56] References Cited

U.S. PATENT DOCUMENTS 4,644,798 2/1987 Tamura et al. ................. 73/724 X
4,656,871 4/1987 Czarnocki ......................... 73/724
4,716,492 12/1987 Charboneau et al. ........... 361/283
4,724,709 2/1988 Antonazzi et al. ............... 73/701

FOREIGN PATENT DOCUMENTS 62-267636 11/1987 Japan .
63-19527 1/1988 Japan .

Primary Examiner—Donald A. Griffin
Attorney, Agent, or Firm—Joseph Scafetta, Jr.

[57] ABSTRACT

A constant-capacitance capacitor is series-connected with a variable-capacitance capacitor whose capacitance varies with the pressure. The other end of the variable-capacitance capacitor is connected to the ground potential terminal of a D.C. power source. The terminal voltage of the variable-capacitance capacitor is compared with a threshold voltage provided by the D.C. power source by means of a comparator. An output voltage of the comparator is stored into a memory in synchronism with a clock pulse signal. An output voltage of the memory is integrated by an integrator. An output voltage of the integrator is supplied to a buffer amplifier for lowering the signal source impedance with respect to the output voltage. An output voltage obtained from the buffer amplifier is fed back to the other end of the constant-capacitance capacitor and at the same time supplied to an output terminal.

18 Claims, 9 Drawing Sheets

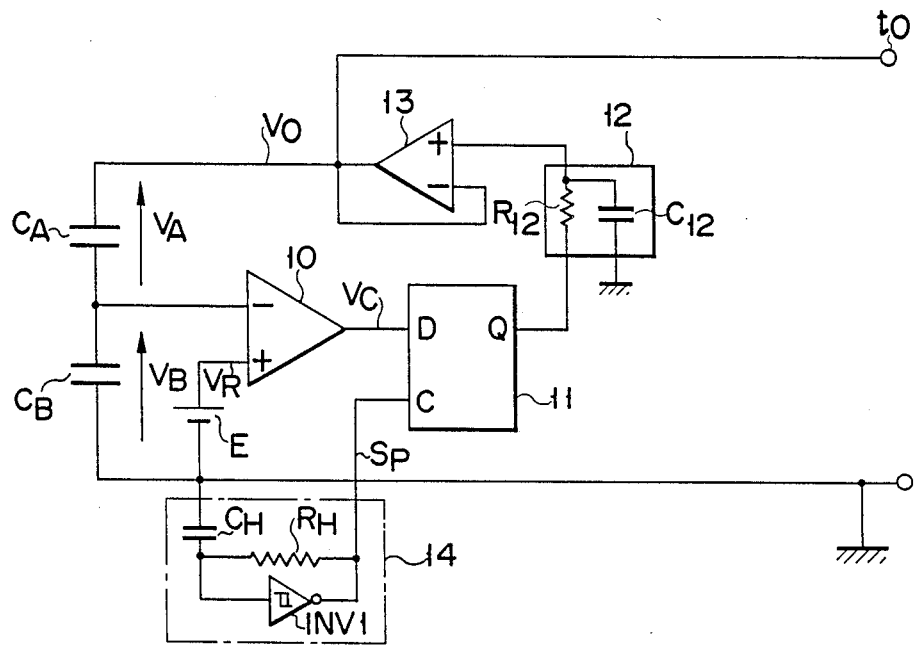
F I G. 1
F I G. 3A  SP  
F I G. 3B  16b  
F I G. 3C  16c  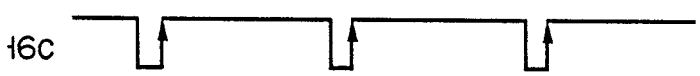
F I G. 3D  16d  

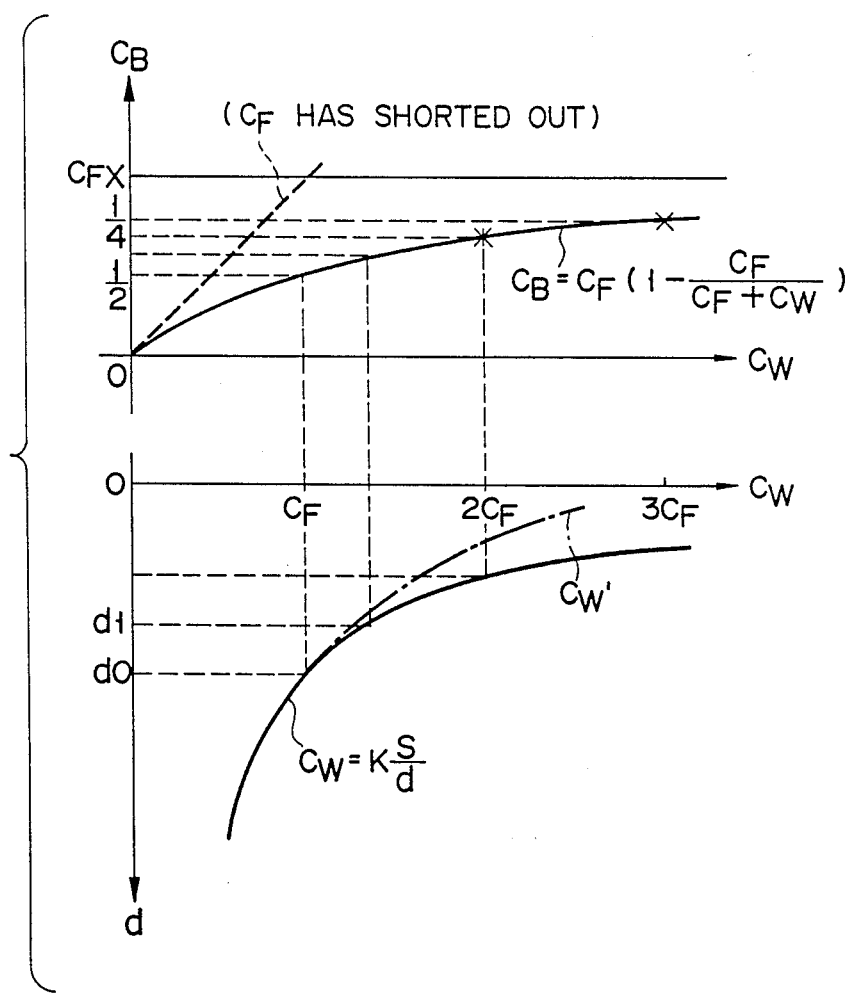
F I G. 8

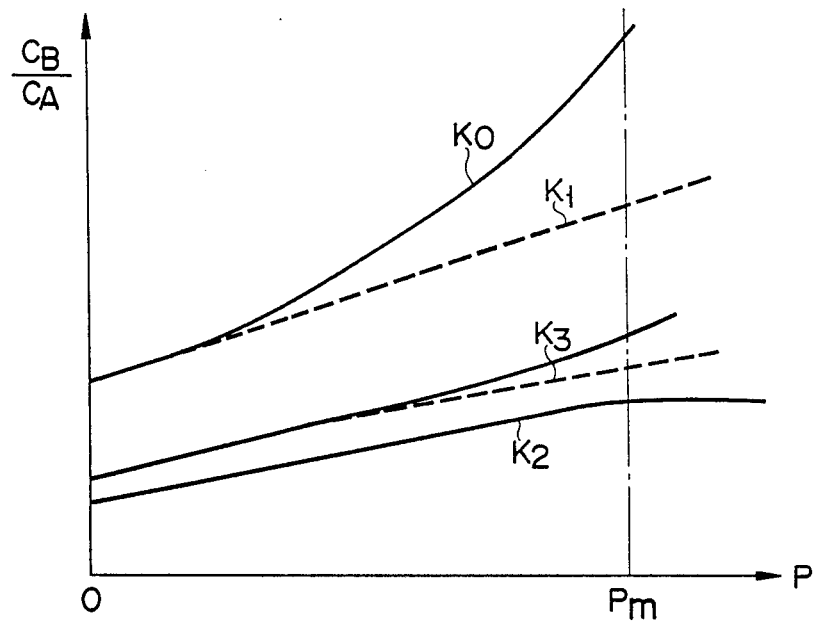
F I G. 13
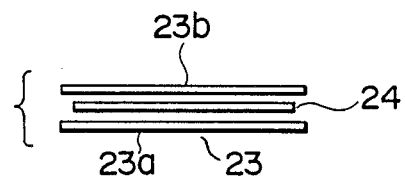
F I G. 16

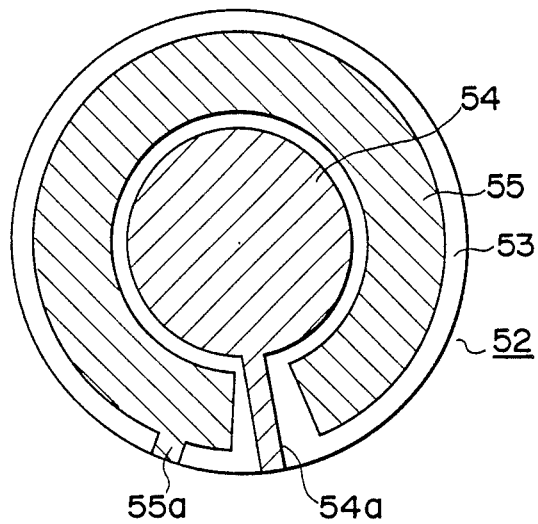
F I G. 14
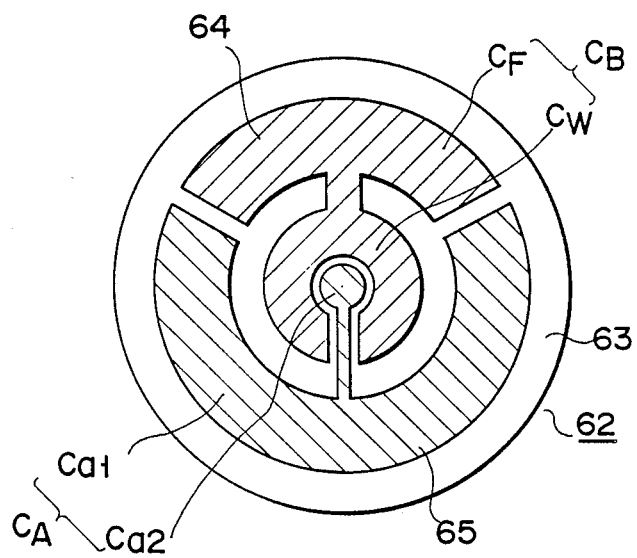
F I G. 15

VARIABLE-CAPACITANCE TYPE SENSOR AND VARIABLE-CAPACITANCE TYPE SENSOR SYSTEM USING THE SAME

BACKGROUND OF THE INVENTION

1. Field of the Invention

This invention relates to a variable-capacitance type sensor acting as a pressure-capacitance transducer and used in a pressure sensor and the like and to a variable-capacitance type sensor system for sensing variation in the electrical capacitance of the variable-capacitance type sensor.

2. Description of the Related Art

For example, devices such as pressure sensors may be effectively used in refrigeration systems mounted on cars so as to sense the pressure of the refrigerant, convert the sensed pressure into an electrical signal, and supply the same to a control circuit.

A diaphragm formed of a silicon semiconductor is known as the above pressure sensor. However, when the pressure sensor is used under a severe mounting condition and a violent vibration condition like the devices mounted on a car, a problem tends to occur in the conditions encountered by durability and reliability of the pressure sensor. With such a problem taken into consideration, a variable-capacitance type transducer has been provided as a pressure sensor which can be most adequately used in the above severe service condition. The variable-capacitance type transducer is disclosed in, for example, U.S. Pat. No. 4,716,492 by Charboneau et al. When a distance between two electrode plates constituting a capacitor varies according to pressure, the variable-capacitance type transducer derives the variation in the distance as a variation in the capacitance of the capacitor. Then, the derived capacitance is compared with the capacitance of a reference capacitor to provide an electrical signal corresponding to the pressure.

However, the variable-capacitance type transducer only has a pressure sensing range of 100 Kpa to 5 Mpa. Therefore, in a case where the pressure sensor is used as a pressure sensing means of the refrigeration system of the car, it is necessary to provide an electric circuit for effecting the signal processing to derive an electrical signal representing variation in the capacitance of the variable-capacitance type transducer at a distance from the pressure sensing terminals of the transducer because of the severe service condition in addition to the narrow pressure sensing range. However, if an electric circuit disposed at a distance from the pressure sensing terminals is used to effect the signal processing, the S/N ratio becomes extremely low and it becomes impossible to derive an effective signal.

In order to solve the above problem in the prior art, a signal processing system for converting variation in the capacitance into a corresponding voltage signal is disposed near the pressure sensing terminals of the transducer as is disclosed in U.S. patent application No. 85961 filed by Kawate et al. on May 5, 1986 and now abandoned. That is, the sensor of Kawate et al. is constructed such that a variable capacitor is disposed on the under surface of a ceramic base plate in the sensor and a signal processing circuit for converting a capacitance variation signal into a voltage signal and an electric circuit for sensor calibration are disposed on the upper surface of the base plate and are integrally formed with the variable capacitor in a compact form. With the above sensor, when the variable capacitor primarily generates an electric signal in response to a physical amount such as pressure to be measured, the electric signal is converted into a voltage signal by means of the signal processing circuit and at the same time subjected to a calibration process by means of the electric circuit for calibration so as to derive a voltage signal necessary for the control. That is, with the sensor of Kawate et al., an electric signal of high quality or voltages of practically wide range can be obtained by disposing the signal processing circuit which can be formed in an IC form and the electric circuit for sensor calibration extremely near the sensing terminals of the pressure sensor.

However, when the construction in which the signal processing circuit and the electric calibration circuit are disposed extremely near the sensing terminals of the pressure sensor is actually applied to a sensor system, the following undesirable problems will occur.

That is, since the transducer is generally disposed near an object to be measured, it tends to be influenced by the electromagnetic field in the environment in which the object is disposed. Therefore, in order to derive a reliable signal, it is necessary to form the transducer with a construction which is hardly affected by the influence of the measuring environment. However, in the sensor system described above, the reference capacitor and the variable-capacitance capacitor are selected together as one of the two sets of different power source potentials by means of a complicated operation system including a selection switch, thus permitting the sensor system to be operated on an intermediate potential. Therefore, it becomes necessary to separate a pair of opposing electrodes of the transducer from a portion which is set at the ground potential. As a result, a stray static capacitance occurs between the electrodes and the object to be measured and the capacitance thereof tends to be influenced by a variation in the external electric field. Further, the variable-capacitance capacitor is discharged via the stray static capacitor formed between the variable-capacitance capacitor and the ground, causing a measurement error.

SUMMARY OF THE INVENTION

An object of this invention is to provide a variable-capacitance type sensor system which is reliable and can effect the precise measurement by eliminating the influence by the external electric field and preventing the variable capacitor from being discharged via the floating static capacitor formed between the variable capacitor and the ground.

Another object of this invention is to provide a variable-capacitance type sensor acting as a pressure-capacitance transducer which can derive a voltage varying in direct or inverse proportion to variation in the capacitance of a planar electrode capacitor even when the capacitor in which an output voltage does not vary in direct or inverse proportion to variation in the capacitance is used as a variable capacitor.

According to a first aspect of this invention, there is provided a variable-capacitance type sensor system comprising series-connected first and second capacitors, the second capacitor being connected at one end to one end of the first capacitor, and one of the first and second capacitors acting as a pressure-capacitance transducer; detecting means, connected to a connection node between the first and second capacitors, for detecting a terminal voltage of the second capacitor input via the connection node; a memory connected to an output terminal of the detecting means, for receiving an output of the detecting means in synchronism with a clock signal and storing the same; an integrator connected between an output terminal of the memory and the other end of the first capacitor, for charging the first and second capacitors which are serially connected according to an output voltage derived by integrating the output of the memory, the output voltage of the integrator varying in inverse proportion to the capacitance of the first capacitor when the first capacitor acts as the transducer, and in proportion to the capacitance of the second capacitor when the second capacitor acts as the transducer; and an output terminal connected to the output terminal of the integrator, for outputting the output voltage of the integrator.

According to a second aspect of this invention, there is provided a variable-capacitance type sensor system comprising first and second capacitors, the second capacitor being connected at one end to one end of the first capacitor; selection means, connected between the other ends of the first and second capacitors, for sequentially and periodically completing one of a charging circuit for charging the first capacitor, a parallel circuit for transferring the charge of the first capacitor to the second capacitor, and a discharging circuit for discharging the charge of the first and second capacitors; detecting means, connected to the other end of the second capacitor, for detecting a voltage occurring across the first and second capacitors when the parallel circuit of the first and second capacitors is completed by the selection means; a memory connected to an output terminal of the detecting means, for receiving an output of the detecting means in synchronism with a clock signal and storing the same; an integrator connected between an output terminal of the memory and the other end of the first capacitor, for supplying an output voltage derived by integrating the output of the memory to the first capacitor when the charging circuit for the first capacitor is completed by the selection means, the output voltage of the integrator varying one of (a) in proportion to the capacitance of the second capacitor and (b) in inverse proportion to the capacitance of the first capacitor; and an output terminal connected to the output terminal of the integrator, for outputting the output voltage of the integrator.

According to a third aspect of this invention, there is provided a variable-capacitance type sensor comprising a planar electrode capacitor which has fixed and movable electrodes disposed to face each other an whose capacitance varies according to a displacement in the distance between the electrodes; and a constant-capacitance capacitor serially connected to the planar electrode capacitor, the capacitance of the variable-capacitance type sensor which varies according to a pressure applied thereto being a resultant capacitance of the capacitance of the planar electrode capacitor and that of the constant-capacitance capacitor.

BRIEF DESCRIPTION OF THE DRAWINGS

FIG. 1 is a circuit diagram showing the basic construction of a variable-capacitance type sensor system according to this invention;

FIGS. 3A to 3D are timing charts showing the switching timings of an electronic switching circuit used in the circuit of FIG. 2;

FIG. 8 is a diagram showing the characteristic of a variable-capacitance type sensor according to this invention when a planar electrode capacitor is used as the variable-capacitance type sensor;

FIG. 13 is a characteristic diagram for illustrating the operation and effect of the sensor system of FIG. 11;

FIG. 14 is a plan view showing another example of the fixed electrode of the planar electrode capacitor;

FIG. 15 ia a plan view showing still another example of the fixed electrode of the planar electrode capacitor; and FIG. 16 is a view showing the construction of the planar electrode capacitor formed by taking correction means for correcting errors caused by a variation in ambient temperature into consideration.

DETAILED DESCRIPTION OF THE PREFERRED EMBODIMENTS

Figure 2:
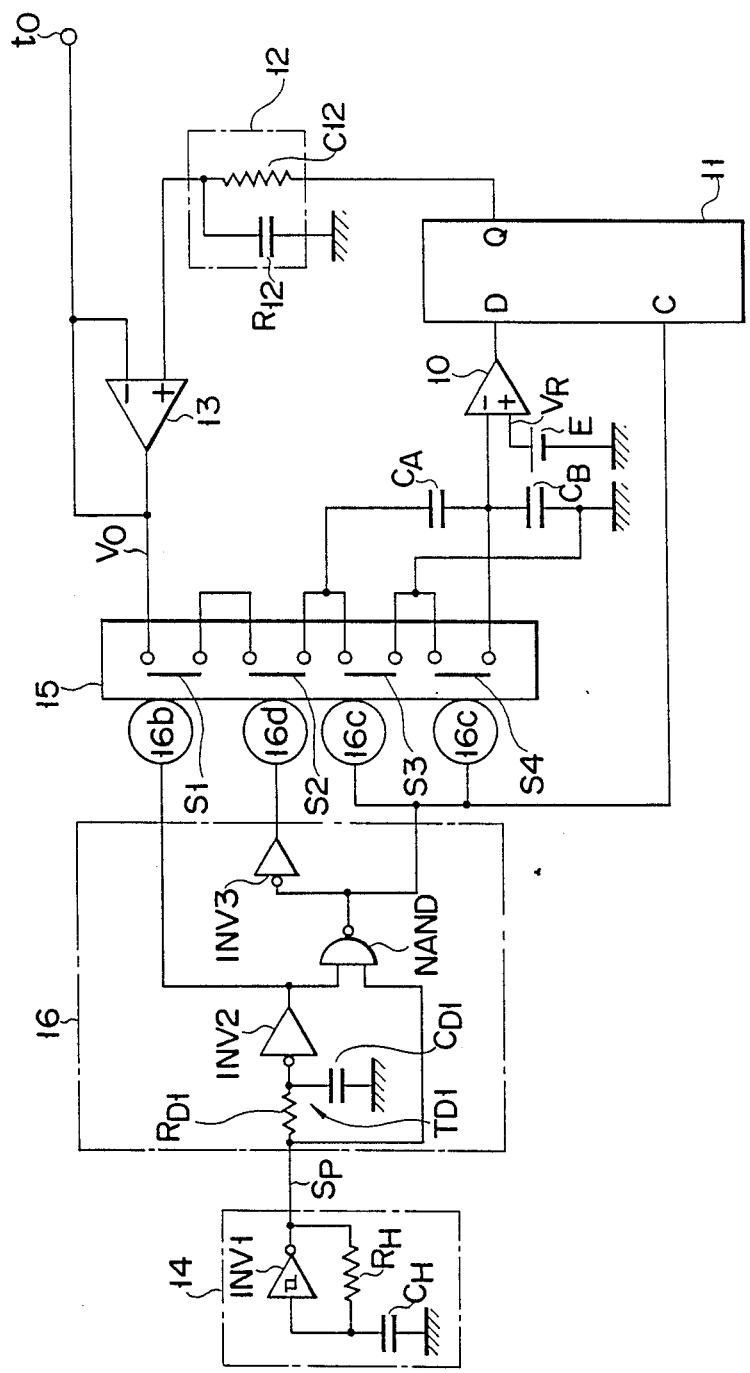
FIG. 2 is a circuit diagram showing a first embodiment of a variable-capacitance type sensor system according to this invention.

First, the basic construction of a variable-capacitance type sensor system according to this invention is described with reference to FIG. 1. Capacitors $C_A$ and $C_B$ which are series-connected are used as fixed and movable capacitors. That terminal of the capacitor $C_B$ which is not connected to the capacitor $C_A$ is connected to the ground potential terminal of a D.C. power source E. The terminal voltage $V_B$ across the capacitor $C_B$ is supplied to one input terminal of a voltage comparator 10. The other input terminal as the reference input terminal of the comparator 10 is supplied with a predetermined threshold voltage $V_R$ from the D.C. power source E. That is, the comparator 10 compares the terminal voltage $V_B$ of the capacitor $C_B$ with the predetermined threshold voltage $V_R$ supplied from the D.C. power source E and outputs an output voltage $V_C$ corresponding to the comparison result. In the polarities of the input terminals as shown, the output voltage $V_C$ is set to a predetermined high voltage $V_H$ when the terminal voltage $V_B$ is higher than the threshold voltage $V_R$ and is set to a predetermined low voltage $V_L$ when the terminal voltage $V_B$ is lower than the threshold voltage $V_R$.

The output voltage $V_C$ is set into a memory 11 in synchronism with a clock pulse signal Sp. An output voltage of the memory 11 is integrated by means of an integration circuit 12 made of a resistor $R_{12}$ and a capacitor $C_{12}$. An output voltage of the integration circuit 12 is supplied to a buffer amplifier 13 which functions to lower the signal source impedance for the output voltage. An output voltage $V_O$ of the buffer amplifier 13 is fed back to that terminal of the capacitor $C_A$ which is not connected to the capacitor $C_B$ and at the same time supplied to an output terminal $t_O$.

The clock pulse signal Sp used as a timing signal causing data to be received into the memory 11 is generated from a clock signal generator 14. As shown in FIG. 1, the clock signal generator 14 is constructed by a hysteresis oscillator which is formed by connecting a feedback resistor $R_H$ and an input holding capacitor $C_H$ to a hysteresis input inverter INV1, for example.

Further, with the construction of FIG. 1, the threshold voltage $V_R$ is supplied from the D.C. power source E to the comparator 10. However, it is possible to use a logic IC having a substantially constant threshold level as a comparator.

Next, the operation of the variable-capacitance type sensor system with the above construction is explained.

Assume that the output voltage $V_O$ of the integration circuit 12 is applied to the series-connected capacitors $C_A$ and $C_B$ via the buffer amplifier 13. Then, the potential distribution can be expressed as follows:

$$V_A = V_O\{C_B/(C_A+C_B)\}, \quad (1)$$

$$V_B = V_O\{C_A/(C_A+C_B)\} \quad (2)$$

Assume now that the terminal voltage $V_B$ of the capacitor $C_B$ is lower than the threshold voltage $V_R$ from the D.C. power source E. Then, a voltage is applied to or negatively fed back to the series-connected capacitors $C_A$ and $C_B$ so as to increase the output voltage $V_O$. As a result, the output voltage $V_O$ becomes stable when the condition of $V_B = V_R$ is obtained.

At this time, since the capacitors $C_A$ and $C_B$ are serially connected, the following equations can be obtained:

$$C_A \cdot V_A = C_B \cdot V_B \quad (3)$$

$$\begin{aligned} V_O &= V_A + V_B = C_B \cdot V_B/C_A + V_B \\ &= (1 + C_B/C_A)V_B = (1 + C_B/C_A)V_R \end{aligned} \quad (4)$$

Therefore, as is clearly seen from the equation (4), if the capacitor $C_B$ is used as a transducer whose static capacitance is variable and the capacitor $C_A$ is used as a reference capacitor whose static capacitance is fixed, one end of the transducer can be set to the same potential as one end of the power source and an output voltage which varies in direct proportion to variation in the capacitance of the transducer can be obtained.

The above explanation is made for the basic construction of the sensor system. However, in practice, it is almost impossible to obtain the capacitor structure in which influence by the leakage resistance between two terminals can be completely neglected. Therefore, in practice, the potential distribution of the series-connected capacitors is influenced by the distribution of the leakage resistance between the two terminals when a voltage applied to the series-connected capacitors does not vary or slowly varies. With the above condition taken into consideration, it is practical to sense the potential distribution of the series-connected capacitors while the refresh operation for the capacitors is being periodically effected at a high speed.

FIG. 2 is a circuit diagram showing a series-connected capacitors type sensor system as a first embodiment of the variable-capacitance type sensor system according to this invention which is made with the above problems taken into consideration. In FIG. 2, portions which correspond to those of FIG. 1 are denoted by the same reference numerals and the explanation thereof is omitted. Here, a circuit for periodically effecting the recharging operation with respect to the series-connected capacitors $C_A$ and $C_B$ at a high speed is mainly explained.

That is, in this embodiment, the clock pulse signal Sp output from the clock signal generator 14 is supplied to a clock pulse distributor 16 and the electronic switching circuit 15 is controlled by a pulse signal distributed by the clock pulse distributor 16. The charging circuit for charging the series-connected capacitors $C_A$ and $C_B$ by the output voltage $V_O$ of the buffer amplifier 13 and the discharging circuit for discharging the capacitors $C_A$ and $C_B$ are alternately completed by the switching operation to sense the potential distribution while the series-connected capacitors $C_A$ and $C_B$ are being recharged.

In the clock pulse distributor 16, a pulse signal 16b which is an inverted delay signal as shown in FIG. 3B can be obtained by supplying the clock pulse signal Sp output from the clock signal generator 14 shown in FIG. 3A to an inverter INV2 via a delay circuit TD1 constructed of a resistor $R_{D1}$ and capacitor $C_{D1}$. Further, a pulse signal 16c as shown in FIG. 3C can be obtained by supplying the pulse signal 16b and the clock pulse signal Sp to a NAND circuit, and an inverted pulse signal 16d as shown in FIG. 3D can be obtained by supplying the pulse signal 16c to an inverter INV3.

The electronic switching circuit 1 has four series-connected electronic switches S1 to S4 whose conduction states can be controlled by the pulse signals 16b, 16c, and 16d supplied from the pulse distributor 16. One end of the electronic switch S1 is connected to the output terminal of the buffer amplifier 13 and one end of the electronic switch S4 is connected to the input terminal of the comparator 10. One end of a series circuit of the capacitors $C_A$ and $C_B$ is connected to a connection node between the electronic switches S2 and S3 and the other end thereof is connected to a connection node between the electronic switches S3 and S4. Further, one of electronic switch S4 is also connected to a connection node between the capacitors $C_A$ and $C_B$.

Now, the operation of the sensor system with the above construction is explained.

Assume now that the terminal voltage of the capacitor $C_B$ detected by the comparator 10 is set into the memory 11 in synchronism with the rising edge of the clock pulse signal 16c output from the pulse distributor 16. Then, the voltage data is integrated by the integration circuit 12 and an output voltage $V_O$ is derived from the output terminal $t_O$ by means of the buffer amplifier 13. The output voltage $V_O$ is also applied to the electronic switching circuit 15.

When the electronic switches S1 and S2 are turned on at the same time and the electronic switches S3 and S4 are turned off, the capacitors $C_A$ and $C_B$ are charged by the output voltage $V_O$ supplied via the buffer amplifier 13. When one of the electronic switches S1 and S2 is turned off and the electronic switches S3 and S4 are turned on, the discharging circuit of the capacitors $C_A$ and $C_B$ is completed, thereby causing the capacitors $C_A$ and $C_B$ to be simultaneously discharged. As the result of this discharging, it becomes possible to sense or detect the potential distribution under a condition that the presence of the leakage resistances between the terminals of the capacitors $C_A$ and $C_B$ can be neglected by driving the electronic switching circuit by pulses so as to make the repetition frequency of the charging and discharging operations sufficiently high.

As described above, if the capacitor $C_B$ is used as the transducer whose static capacitance is variable and the capacitor $C_A$ is used as the reference capacitor whose static capacitance is constant, an output voltage $V_O$ which varies in proportion to the variation in the capacitance of the transducer can be obtained without receiving any influence of the leakage resistance between the terminals of the capacitor. In this case, the output voltage $V_O$ can be obtained by the following equation as indicated by the equation (4):

$$V_O = (1 + C_B/C_A) \cdot V_R$$

In the above explanation, an output voltage which varies in proportion to the variation in the capacitance of the transducer is derived by using the variable capacitance capacitor acting as the transducer and the constant-capacitance capacitor as the reference capacitor. However, in some cases, it is necessary to derive an output voltage which varies in inverse proportion to the variation in the capacitance of the transducer. The above requirement can be realized by using the capacitor $C_A$ as the transducer and the capacitor $C_B$ as the reference capacitor.

Figure 4:
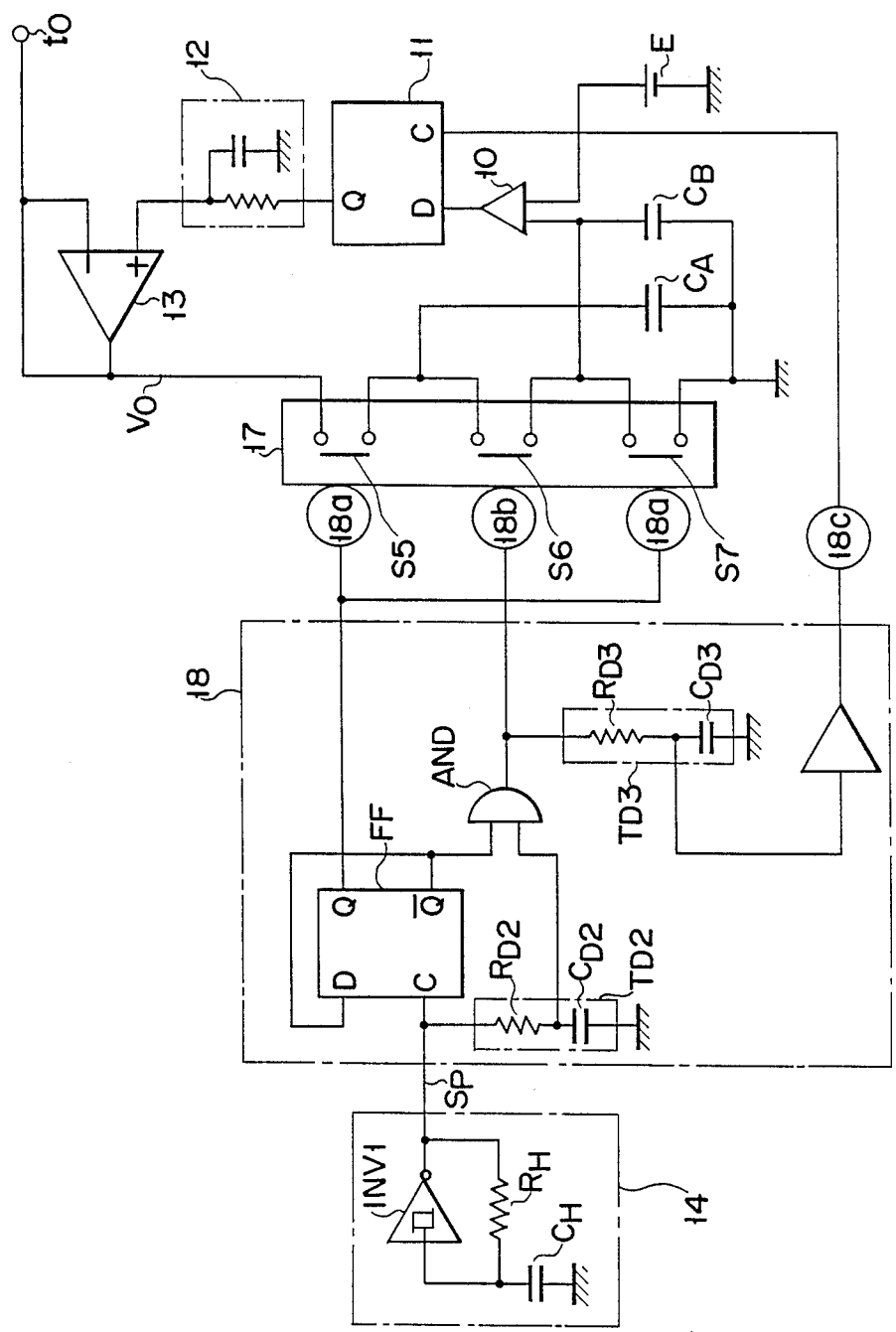
FIG. 4 is a circuit diagram showing a second embodiment of a variable-capacitance type sensor system according to this invention.

FIG. 4 shows a parallel-connected capacitors type sensor system as a second embodiment of the variable-capacitance type sensor system according to this invention. Portions in FIG. 4 which are the same as those of FIG. 2 are denoted by the same reference numerals and the explanation thereof is omitted, and only different portions are explained.

As shown in FIG. 4, a clock pulse signal Sp output from a clock signal generator 14 is supplied to a clock pulse distributor 18. An electronic switching circuit 17 is controlled by a pulse signal distributed by the clock pulse distributor 18. In other words, the electronic switching circuit 17 selectively connects one end of each of two capacitors $C_A$ and $C_B$ which are commonly connected at the other end to one end of a power source E in the following manner. That is, the electronic switching circuit 17 effects the selective switching operation to selectively complete one of a charging circuit for charging the capacitor $C_A$ by the output voltage $V_O$ of the buffer amplifier 13, a parallel connection circuit for separating the charged capacitor $C_A$ from the output terminal of the buffer amplifier 13 and at the same time transferring the charge from the capacitor $C_A$, to the capacitor $C_B$ and a discharging circuit for discharging the charge of the capacitors $C_A$ and $C_B$.

Figure 5:
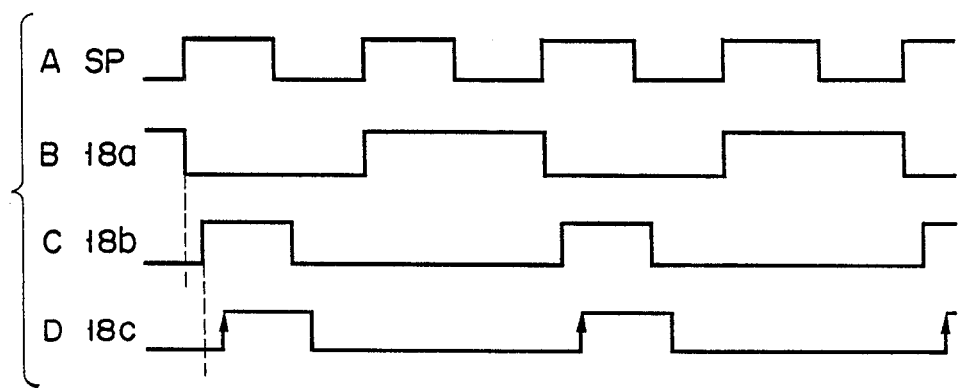
FIGS. 5A to 5D are timing charts showing the switching timings of an electronic switching circuit used in the circuit of FIG. 4.

In the clock pulse distributor 18, a pulse signal 18a as shown in FIG. 5B can be derived from an output terminal Q of a flip-flop circuit FF by supplying a clock pulse signal Sp output from the clock pulse generator 14 as shown in FIG. 5A to the flip-flop circuit FF. Further, a pulse signal 18b as shown in FIG. 5C can be obtained by passing an inverted output signal from an inverting output terminal $\overline{Q}$ of the flip-flop circuit FF and a signal obtained by delaying the clock pulse signal Sp by a delay circuit TD2 formed of a resistor $R_{D2}$ and a capacitor $C_{D2}$ through an AND circuit. Also, a pulse signal 18c as shown in FIG. 5D can be obtained by passing the pulse signal 18b through a delay circuit TD3 constructed by a resistor $R_{D3}$ and a capacitor $C_{D3}$.

The electronic switching circuit 17 has three series-connected electronic switches S5 to S7 whose conduction states are controlled by pulse signals output from the pulse distributor 18. One end of the electronic switch S5 is connected to an output terminal of the buffer amplifier 13. One end of the electronic switch S7 is connected to one end of each of the capacitors $C_A$ and $C_B$ and at the same time connected to one end of the power source E. A connection node between the electronic switches S6 and S7 is connected to an input terminal of the comparator 10.

Now, the operation of the sensor system of the above construction is explained.

If the electronic switches S5 and S7 of the electronic switching circuit 17 are turned on by the pulse signal 18a output from the pulse distributor 18 and the i electronic switch S6 is turned off when the capacitor $C_A$ is set in the discharged state, the capacitor $C_A$ is charged by the output voltage $V_O$ of the buffer amplifier 13. At this time, the discharging circuit for the capacitor $C_B$ is completed and the capacitor $C_B$ is discharged via the discharging circuit. Next, when the electronic switch S6 is turned on and the electronic switches S5 and S7 are turned off, the capacitor $C_A$ is separated from the output terminal of the buffer amplifier 13 and at the same time the capacitors $C_A$ and $C_B$ are connected in parallel to permit the charge to be transferred from the capacitor $C_A$ to the capacitor $C_B$. At this time, a voltage $V_S$ developed across the capacitors $C_A$ and $C_B$ is detected by the comparator 10. After the voltages of the capacitors $C_A$ and $C_B$ are detected, the capacitors $C_A$ and $C_B$ are discharged to be ready for the next operation cycle. In this case, the stable condition attained by the above operation can be expressed by the following equation:

$$V_O \cdot C_A = V_S(C_A + C_B) = V_R(C_A + C_B) \tag{5}$$

Therefore, the following equation which is the same as the equation (4) can be obtained:

$$V_O = (1 + C_B/C_A) V_R$$

In this way, the output voltage $V_O$ which varies in inverse proportion to the variable capacitance of the capacitor $C_A$ can be obtained while the recharging operation is being effected by using the capacitor $C_A$ as the constant-capacitance capacitor and the capacitor $C_B$ as the variable-capacitance type transducer and periodically effecting the selective switching operation as described above.

Further, compared with the series-connected capacitors type sensor system as shown in FIG. 2, the parallel-connected capacitors type sensor system as shown in FIG. 4 has advantages as follows. First, since the capacitors $C_A$ and $C_B$ can be connected at one end directly to one end of the power source E, the one end of the transducer can be set at the same potential as the one end of the power source E. That is, it is safe to say that one of the plate electrodes constitutes a shield for protecting the internal circuit from the external field, making it possible to effect the precise and highly reliable measurement without receiving any influence by the external noise. Further, since the capacitance ratio $C_B/C_A$ is an important factor for determining the sensitivity, a great advantage that the sensitivity can be adjusted can be obtained by designing the capacitors $C_A$ and $C_B$ such that the capacitance of the capacitor $C_A$ or $C_B$ can be easily adjusted from the exterior.

With the above construction, an output which varies in direct or inverse proportion to variation in the capacitance can be selectively obtained by the same circuit construction and with the same stability kept unchanged.

Next, the capacitor used in the above variable-capacitance type sensor system is explained.

Figure 6:
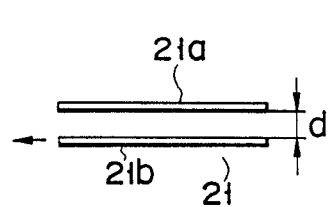
FIG. 6 is a view showing the principle of a planar electrode capacitor.

There are provided various types of proximity sensors, but a planar electrode capacitor 21 as shown in FIG. 6 is generally known as that which is simple in construction and low in cost. The planar electrode capacitor 21 is a planar electrode capacitance type sensing structure which has a fixed electrode 21a and a movable electrode 21b with the electrode surfaces thereof set to face each other. The static capacitance $C_W$ of the planar electrode capacitor 21 is expressed as follows:

$$C_W = K \cdot S/d \tag{6}$$

where S is the facing surface area, d is the distance between the facing electrodes and K is a constant.

As shown in the equation (6), the static capacitance $C_W$ varies in inverse proportion to the distance d. In a case where the movable electrode 21b is used to move in a direction parallel to the fixed electrode 21a so as to change the facing surface area, the static capacitance will vary in proportion to the traveling distance of the movable electrode 21b. However, when the movable electrode 21b is used to move in a direction perpendicular to the fixed electrode 21a so as to change the distance d, the static capacitance will vary in inverse proportion to the traveling distance of the movable electrode 21b. Therefore, when it is used as it is described, the static capacitance will not vary in proportion to the traveling distance of the movable electrode 21b and the relationship between an output voltage thereof and the traveling distance is substantially deviated from the proportionality.

In this invention, the planar electrode capacitor 21 is used as a sensor capable of producing an output voltage which is substantially proportional to variation in the distance d even when the movable electrode 21b is moved in a direction perpendicular to the fixed electrode 21a.

Figure 7:
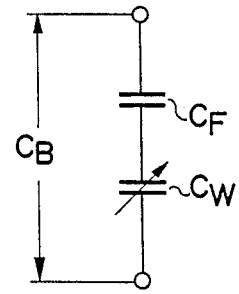
FIG. 7 is a circuit diagram showing the construction of a planar electrode capacitor which is used as a variable-capacitance type sensor according to this invention.

FIG. 7 shows an example of the construction of such a variable-capacitance type sensor in which a constant-capacitance capacitor $C_F$ and a capacitor $C_W$ movable in a direction perpendicular to the capacitor $C_F$ are series-connected and the resultant capacitor of the capacitors $C_W$ and $C_F$ constitutes a sensing capacitor $C_B$. As shown in FIG. 8, the characteristic of the sensing capacitor $C_B$ can be expressed as follows:

$$C_B = C_F\{1 - C_F/(C_F + C_W)\} \tag{7}$$

As is clearly understood by comparing the characteristic with a graph indicating the variation in the capacitance with respect to the distance d which is shown on the lower side of FIG. 8, variation in the capacitance of the variable-capacitance capacitor $C_W$ with respect to variation or reduction in the distance from the constant distance $d_0$ to $d_1$ may cause the output voltage to vary linearly or in proportion to the variation in the distance d.

Therefore, if the variable-capacitance type sensor of the above construction or the sensing capacitor $C_B$ is used, the planar electrode capacitor in which the vertical distance between the electrodes is changed can be used as a proximity capacitor.

Figure 9:
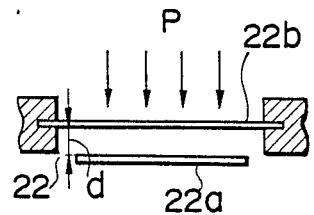
FIG. 9 is a view showing the construction of a planar electrode capacitor having a movable electrode whose edge portion is fixed.

Assume that a planar electrode capacitor 22 is formed as shown in FIG. 9 to have a movable electrode 22b which is formed of a thin disk plate and disposed in opposition to a fixed electrode 22a and whose edge portion is fixed. If an equally distributed load P is applied to the movable electrode 22b, the movable electrode 22b is distorted to change the distance d between the movable electrode 22b and the fixed electrode 22a. In a case where a variable-capacitance type sensor or sensing capacitor $C_B$ is constructed by series-connecting the distance variable type capacitor of the above construction to a constant-capacitance capacitor as shown in FIG. 7, a static capacitance between the movable electrode 22b and the fixed electrode 22a varies as shown by a one-dot chain line $C_W'$ in FIG. 8. As is clearly seen from the curve $C_W'$, variation in the static capacitance with respect to variation in the distance d becomes nearer to the linearity so that an output voltage which is substantially proportional to the variation in the vertical distance can be obtained.

Figure 10:
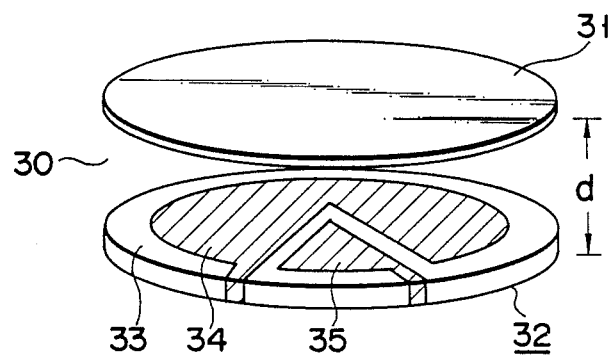
FIG. 10 is a perspective view showing the construction of fixed and movable electrodes of a planar electrode capacitor in which the edge portion of the movable electrode is fixed.
Figure 11:
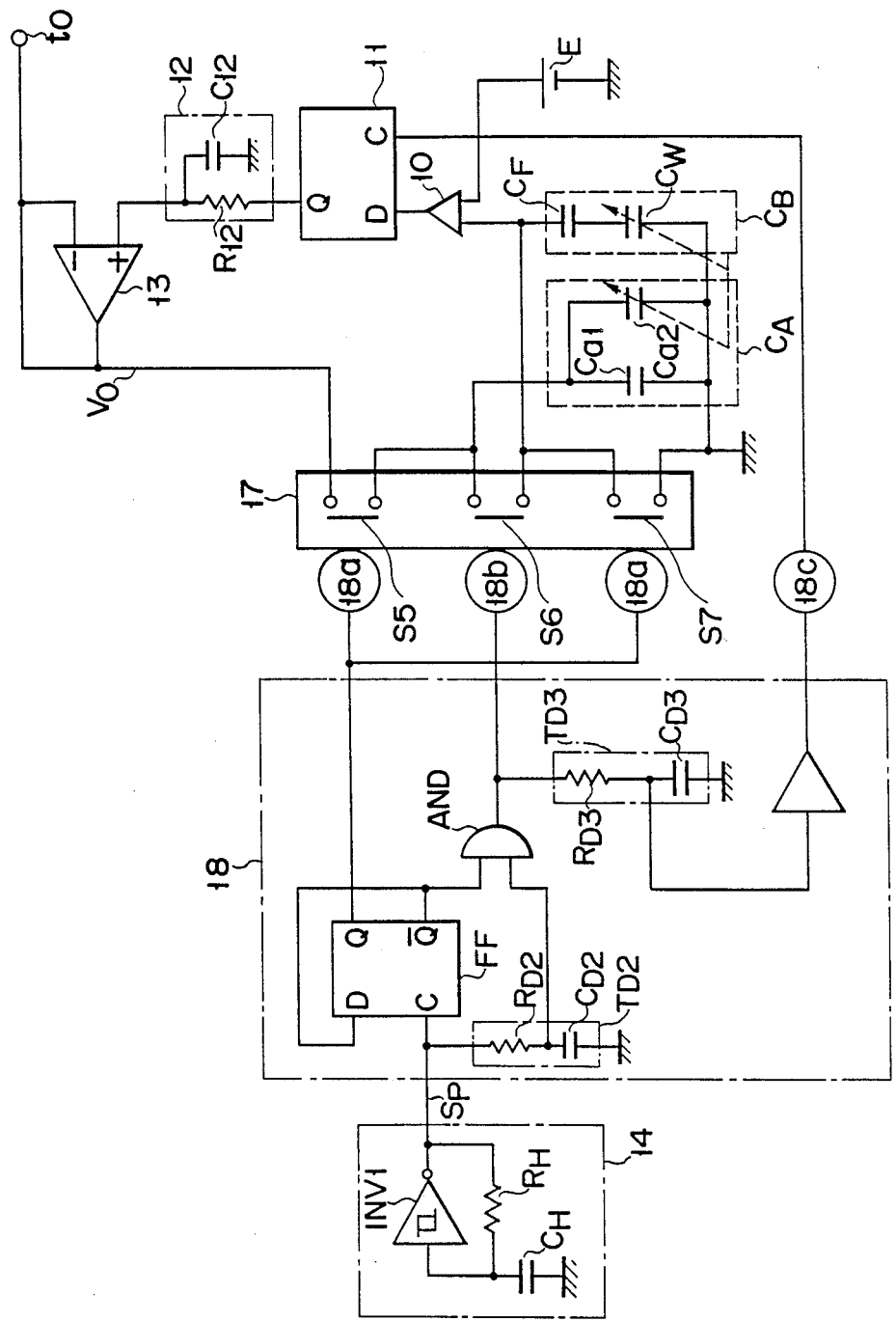
FIG. 11 is a circuit diagram showing a third embodiment of a variable-capacitance type sensor system according to this invention in which the planar electrode capacitor of FIG. 10 is applied to the variable-capacitance capacitance type sensor system of FIG. 4.

FIG. 10 shows an example of a vertical distance variable type capacitor and FIG. 11 is a circuit diagram showing the circuit construction obtained by applying the vertical distance variable type capacitor to the parallel-connected capacitors type sensor system of FIG. 4.

As shown in FIG. 10, the vertical distance variable type capacitor 30 includes a movable electrode 31 of the thin disk metal plate having a fixed edge portion and a fixed disk electrode 32 disposed in opposition to the movable electrode 31. In this case, the fixed electrode 32 has a thin metal film disposed on the surface of an insulative base plate 33, and the thin metal film is divided into a plurality of portions by cutting off part of the whole portion in a sector form so as to form electrode regions 34 and 35. The sector electrode region 35 is used as a first variable electrode and cooperates with the opposing movable electrode 31 to constitute a variable-capacitance capacitor $C_{a2}$. The other electrode region 35 is used as a second variable electrode and cooperates with the opposing movable electrode 31 to constitute a variable-capacitance capacitor. As shown in FIG. 11, the variable-capacitance capacitor $C_{a2}$ is connected in parallel with the constant-capacitance capacitor $C_{a1}$ to constitute a first capacitor $C_A$. The variable-capacitance capacitor $C_W$ is connected in series with the constant-capacitance capacitor $C_F$ to constitute a second capacitor $C_B$. That is, the resultant capacitor of the capacitors $C_F$ and $C_W$ is used as the variable-capacitance type sensor or sensing capacitor $C_B$.

Figure 12:
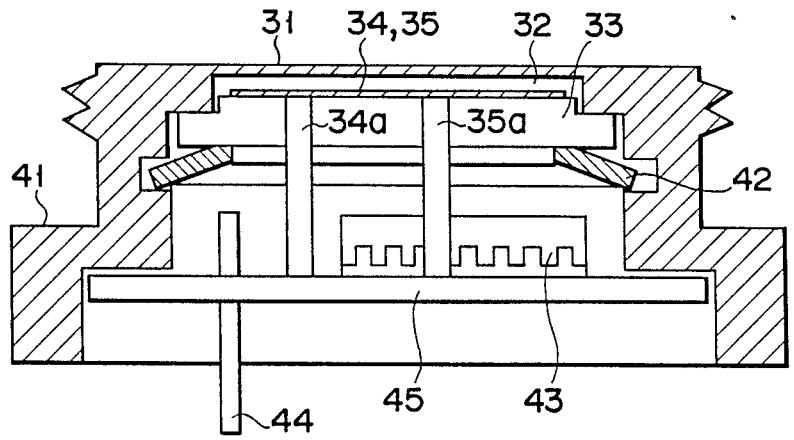
FIG. 12 is a cross sectional view showing the detailed construction of the planar electrode capacitor of FIG. 10.

In this case, as shown in FIG. 12, the variable-capacitance type sensor used in the above embodiment is constructed to cause a variation in the capacitance when an equally distributed load is applied to the diaphragm electrode having the edge portion fixed to distort the same. Unlike the variable-capacitance type sensor in which the diaphragm is horizontally moved to change the distance between the electrodes, the relation between the applied load and the capacitance is determined for each diaphragm according to the factors of the diaphragm such as Young's modulus relating to the diameter, thickness and material thereof. In FIG. 12, a casing 41 fixes the edge portion of the metal diaphragm electrode or movable electrode 31 disposed in an opening formed in the upper surface. In the casing 41, the fixed electrode 32 having the electrode regions 34 and 35 divided into plural portions on the insulative film 33 is disposed in opposition to the movable electrode 31 and fixed with a C-shaped washer 42 disposed therebetween. Further, in the casing 41, a circuit board 45 on which electronic parts 43, such as amplifiers and a power source, and output terminals 44 are mounted is arranged below the fixed electrode 32. Predetermined terminals on the circuit board 45 are connected to electrode lead-out terminals 34a and 35a led out from the electrode regions 34 and 35 constituting the fixed electrode 32 on the insulative base plate 33.

Therefore, when the vertical distance variable type capacitor 30 shown in FIG. 10 is used to constitute the variable-capacitance type sensor system shown in FIG. 11, an output voltage $V_O$ can be expressed by the equation (4). That is, it can be expressed as follows:

$$V_O = (1 + C_B/C_A)V_R$$

In this case, $C_B$ and $C_A$ are defined as follows:

$$C_B = C_W \cdot C_F/(C_W + C_F), \quad (8)$$

$$C_A = C_{a1} + C_{a2} \quad (9)$$

The term $C_A$ in the denominator of the equation (4) depends on the sum of the capacitance of the constant-capacitance capacitor $C_{a1}$ and that of the variable capacitor $C_{a2}$ which varies with the variation in the applied pressure, and therefore the output voltage $V_O$ tends to be controlled according to the increase in the total capacitance of the sensor.

Now, assume that the fixed capacitance capacitor $C_{a1}$ is used as the first capacitor $C_A$ and the variable capacitance capacitor $C_W$ is used as the second capacitor $C_B$, that is, the construction of FIG. 4 is made. Then, the capacitance ratio $C_B/C_A$ varies according to the pressure P as shown by a curve $K_0$ in FIG. 13. However, if a series circuit of the variable-capacitance capacitor $C_W$ and the constant-capacitance capacitor $C_F$ is used as the second capacitor $C_B$, the rate of deviation from the line becomes smaller as shown by the curve $K_1$, thus making the output voltage characteristic nearer to the linearity. Further, the rising rate of the curve $K_0$ tends to be larger as the pressure P becomes larger and therefore it becomes necessary to use a constant-capacitance capacitor $C_F$ of large capacitance in order to maintain the linearity of the output voltage characteristic with respect to the variation in the pressure over a wide range. However, if the capacitance of the constant-capacitance capacitor $C_F$ is made larger, the capacitance ratio $C_B/C_A$ becomes smaller, lowering the sensitivity.

In contrast, in this embodiment, the first capacitance $C_A$ is constituted by the constant-capacitance capacitor $C_{a1}$ and the variable-capacitance capacitor $C_{a2}$ and variation in the capacitance of the capacitor $C_A$ is positively utilized. Therefore, the rise in the capacitance ratio $C_B/C_A$ in a range in which the pressure P is large can be effectively suppressed as shown by a curve $K_3$ in FIG. 13, thereby preventing the total sensitivity from being lowered.

Further, it is possible to attain a saturation characteristic $K_2$ in which the rise in the output for variation in the pressure P larger than a constant pressure Pm can be suppressed.

In the vertical distance variable type capacitor 30 used in the above embodiment, since distortion in the central portion of the metal diaphragm used as the movable electrode 31 is large, a large variation in the capacitance can be obtained. However, since the edge portion thereof is fixed, the capacitance variation is small. Therefore, it is not always necessary to form the electrode region 35 constituting the variable-capacitance capacitor $C_{a2}$ of the fixed electrode 32 connected in parallel with the constant-capacitance capacitor $C_{a1}$ by cutting off part of the whole portion in a sector form as shown in FIG. 10.

For example, a fixed electrode 52 of the construction shown in FIG. 14 can be used. In the fixed electrode 52, an electrode region 55 constituting a variable-capacitance capacitor $C_{a2}$ is formed on an insulative base plate 53 in position corresponding to the peripheral portion of the metal diaphragm which is subject to less distortion. That portion of the electrode region 55 corresponding to the peripheral portion of the metal plate is used as a constant-capacitance capacitor $C_{a1}$ of a first capacitor $C_A$. In this case, even if the part of the electrode region is used for the constant-capacitance capacitor $C_{a1}$, it also includes a function as the variable-capacitance capacitor $C_{a2}$. Therefore, if the sensor is constituted by using the fixed electrode 52, it is not necessary to additionally form the constant-capacitance capacitor $C_{a1}$ and the whole system can be made compact.

Further, in the fixed electrode 52, an electrode region 54 constituting a variable-capacitance capacitor $C_W$ is formed inside the electrode region 55 formed on the peripheral portion thereof and electrode lead-out terminals 54a and 55a are formed in connection with the electrode regions 54 and 55.

Also, it is possible to use a fixed electrode 62 of the construction a shown in FIG. 15. In the fixed electrode 62, electrode regions 64 and 65 are formed on the peripheral portion of an insulative base plate 63 and divided into an arc form. A portion of the electrode region 64 is formed to extend inwardly. Further, part of the electrode region 65 is formed to extend into the inwardly extending portion of the electrode region 64. That is, the electrode regions 64 and 65 are formed in the form of "E"-shaped rings disposed to face each other and the central projecting portion of the electrode region 64 is formed in a circular shape. The central projecting portion of the electrode region 65 extends into the circular area of the electrode region 64 to form a circular area.

With the above electrode arrangement, the arc portion of the electrode region 65 functions as the constant-capacitance capacitor $C_{a1}$ of the first capacitor $C_A$ and the circular portion of the central projecting portion thereof functions as the variable-capacitance capacitor $C_{a2}$. Likewise, the arc portion of the electrode region 64 functions as the constant-capacitance capacitor $C_F$ of the second capacitor $C_B$ and the circular portion of the central projecting portion thereof functions as the variable-capacitance capacitor $C_W$. Therefore, when the sensor is constituted by using the fixed electrode 62, it is not necessary to additionally form the constant-capacitance capacitors $C_{a1}$ and $C_F$, making the whole system smaller.

In a case where the variable-capacitance type sensor of the above construction is used under a severe condition, the dimensions of the planar electrode structure may vary according to the ambient temperatures, causing the static capacitance to increase or decrease depending on the variation in the ambient temperature.

When taking the above condition into consideration, it is preferable to insert a dielectric film 24 of a desired dielectric factor and temperature coefficient between the fixed electrode 23a and the movable electrode 23b so as to make the planar electrode capacitor 23 which can compensate for variation in the static capacitance caused by the temperature variation. It is known that the temperature coefficient of a polyethylene terephthalate film is $-1500$ PPm/°C. and that of a polyethylene is $+400$ PPm/°C. The films can be used as the dielectric film 24 and inserted between the fixed and movable electrodes so as to compensate for any influence by a variation in the ambient temperature. In this case, a malfunction due to the short-circuit between the fixed and movable electrodes can be effectively prevented.

As described above, according to this invention, a precise and reliable variable-capacitance type sensor system can be provided which is not influenced by the external electric field and in which the variable-capacitance capacitor will not be discharged via a stray static capacitor formed between it and the ground. Further, a variable-capacitance type sensor can be provided in which, even when a planar electrode capacitor is used as a variable-capacitance capacitor which does no cause an output voltage to vary in direct or inverse proportion to a variation in the capacitance thereof, the output voltage can be corrected to vary in substantially direct or inverse proportion to the variation in the capacitance by using a simple correction means.

What is claimed is:

1. A variable-capacitance type sensor system comprising:
    series-connected first and second capacitors, said second capacitor being connected at one end to one end of said first capacitor, and one of said first and second capacitors acting as a pressure-capacitance transducer;
    detecting means connected to a connection node between said first and second capacitors, for detecting a terminal voltage of said second capacitor input via said connection node;
    a memory connected to an output terminal of said detecting means, for receiving an output of said detecting means in synchronism with a clock signal and storing the same;
    an integrator connected between an output terminal of said memory and the other end of said first capacitor, for charging said first and second capacitors which are serially connected according to an output voltage derived by integrating the output of said memory, the output voltage of said integrator varying in inverse proportion to the capacitance of said first capacitor when said first capacitor acts as the transducer, and in proportion to the capacitance of said second capacitor when said second capacitor acts as the transducer; and
    a output terminal connected to the output terminal of said integrator, for outputting the output voltage of said integrator.

2. The system according to claim 1, wherein said second capacitor includes a planar electrode capacitor which has fixed and movable electrodes whose electrode surfaces are set to face each other and whose capacitance varies with variation in a distance between said electrodes in a direction perpendicular to said electrodes.

3. The system according to claim 1, wherein said second capacitor includes:
    a planar electrode capacitor which has fixed and movable electrodes with the electrode surfaces thereof set to face each other and whose capacitor varies with the vertical distance between said facing electrodes; and
    a constant-capacitance capacitor series-connected to said planar electrode capacitor, said second capacitor having a capacitance equal to the resultant capacitance of said planar electrode capacitor and said constant-capacitance capacitor.

4. The system according to claim 1, further comprising charging/discharging selection means for alternately forming a charging circuit for charging said series-connected first and second capacitors by an output voltage of said integrator and a discharging circuit for discharging said first and second capacitors.

5. The system according to claim 4, wherein said charging/discharging selection means includes:
    first switching means connected between said integrator and the other end of said first capacitor, for selectively connecting said series-connected first and second capacitors to said integrator so as to selectively form said charging circuit for charging said series-connected first and second capacitors by an output voltage of said integrator;
    second switching means connected in parallel with said first and second capacitors, for selectively connecting the other end of said first capacitor and said connection node to the other end of said second capacitor so as to selectively form said discharging circuit for discharging said first and second capacitors; and
    switching controlling means for periodically and alternately activating said first and second switching means.

6. The system according to claim 5, wherein
    said first switching means includes a first electronic switch connected between said integrator and the other end of said first capacitor;
    said second switching means includes:
        a second electronic switch connected between the other ends of said first and second capacitors; and
        a third electronic switch connected between said connection node and the other end of said second capacitor; and
    said switching controlling means includes:
        clock pulse generating means for generating a clock pulse of a predetermined period;
        first control signal generating means connected to said clock pulse generating means, for deriving a first control signal for turning on said first electronic switch from the clock pulse; and
        second control signal generating means connected to said first control signal generating means, for deriving a second control signal for turning on said third electronic switch by inverting said first control signal, said second control signal being supplied as said clock signal to said memory.

7. A variable-capacitance type sensor system comprising:
  first and second capacitors, said second capacitor being connected at one end to one end of said first capacitor;
  selection means connected between the other ends of said first and second capacitors, for sequentially and periodically completing one of a charging circuit for charging said first capacitor, a parallel circuit for transferring the charge of said first capacitor to said second capacitor, and a discharging circuit for discharging the charge of said first and second capacitors;
  detecting means connected to the other end of said second capacitor, for detecting a voltage occurring across said first and second capacitors when said parallel circuit of said first and second capacitors is completed by said selection means;
  a memory connected to an output terminal of said detecting means, for receiving an output of said detecting means in synchronism with a clock signal and storing the same;
  an integrator connected between an output terminal of said memory and the other end of said first capacitor, for supplying an output voltage derived by integrating the output of said memory to said first capacitor when said charging circuit for said first capacitor is completed by said selection means, the output voltage of said integrator varying one of (a) in proportion to the capacitance of said second capacitor and (b) in inverse proportion to the capacitance of said first capacitor; and
  an output terminal connected to the output terminal of said integrator, for outputting the output voltage of said integrator.

8. The system according to claim 7, wherein said switching means includes:
  a first electronic switch connected between said integrator and the other end of said first capacitor;
  a second electronic switch connected between the other ends of said first and second capacitors;
  a third electronic switch connected between the other end of said second capacitor and a ground potential point and turned on and off in synchronism with said first electronic switch; and
  control means for selectively turning on and off said first to third electronic switches, said charging circuit being formed when said first and second electronic switches are turned on and said third electronic switch is turned off, said parallel circuit being formed when said first and second switches are turned off and said third electronic switch is turned on, and said parallel circuit being formed when said first to third electronic switches are all turned off.

9. The system according to claim 8, wherein said control means includes:
  clock pulse generating means for generating a clock pulse of a predetermined period;
  first control signal generating means, connected to said clock pulse generating means, for deriving a first control signal for turning on said first and third electronic switches from said clock pulse; and
  second control signal generating means, connected to said clock pulse generating means and said first control signal generating means, for deriving a second control signal for turning on said second electronic switch from said clock pulse and said first control signal, said second control signal being supplied as the clock signal to said memory with a predetermined time delay.

10. The system according to claim 7, wherein said first capacitor includes a planar electrode capacitor which has a fixed electrode and a movable electrode with the electrode surfaces thereof set to face each other and whose capacitance varies as a distance between said fixed and movable electrodes in a direction perpendicular to said fixed and movable electrodes varies; and
  an output voltage of said integrator varies in inverse proportion to variation in the capacitance of said first capacitor.

11. The system according to claim 7, wherein said second capacitor includes a planar electrode capacitor which has fixed and movable electrodes with the electrode surfaces thereof set to face each other and whose capacitance varies as a distance between said fixed and movable electrodes in a direction perpendicular to said fixed and movable electrodes varies; and
  an output voltage of said integrator varies in proportion to variation in the capacitance of said second capacitor.

12. The system according to claim 7, wherein said second capacitor includes:
  a planar electrode capacitor which has fixed and movable electrodes with the electrode surfaces thereof set to face each other and whose capacitance varies as a distance between said fixed and movable electrodes in a direction perpendicular to said fixed and movable electrodes varies;
  a constant-capacitance capacitor series-connected to said planar electrode capacitor, said second capacitor having a resultant capacitance of the capacitances of said planar electrode capacitor and said constant-capacitance capacitor; and
  an output voltage of said integrator varies in proportion to variation in the capacitance of said second capacitor.

13. The system according to claim 7, wherein said first capacitor is constituted by a parallel circuit of a first fixed capacitor and a first variable capacitor; and
  said second capacitor is constituted by a series circuit of a second fixed capacitor and a second variable capacitor.

14. The system according to claim 13, wherein said first and second variable capacitors are each constituted by a planar electrode capacitor which has fixed and movable electrodes with the electrode surfaces thereof set to face each other and whose capacitance varies as a distance between said fixed and movable electrodes in a direction perpendicular to said fixed and movable electrodes varies.

15. The system according to claim 14, wherein the electrode surface of said fixed electrode of said planar electrode capacitor is divided into a plurality of electrode regions;
  said first variable capacitor is constituted by a first electrode region of said fixed electrode of said planar electrode capacitor and said movable electrode of said planar electrode capacitor; and
  said second variable capacitor is constituted by a second electrode region of said fixed electrode of said planar electrode capacitor and said movable electrode of said planar electrode capacitor.

16. The system according to claim 14, wherein the electrode surface of said fixed electrode of said planar electrode capacitor is divided into a plurality of electrode regions;

said parallel circuit of said first variable capacitor and said fixed capacitor is constituted by a first electrode region of said fixed electrode of said planar electrode capacitor and said movable electrode of said planar electrode capacitor; and said second variable capacitor is constituted by a second electrode region of said fixed electrode of said planar electrode capacitor and said movable electrode of said planar electrode capacitor.

17. The system according to claim 14, wherein the electrode surface of said fixed electrode of said planar electrode capacitor is divided into a plurality of electrode regions;

said parallel circuit of said first variable capacitor and said first fixed capacitor is constituted by a first electrode region of said fixed electrode of said planar electrode capacitor and said movable electrode of said planar electrode capacitor; and said series circuit of said second capacitor and said second fixed capacitor is constituted by a second electrode region of said fixed electrode of said planar electrode capacitor and said movable electrode of said planar electrode capacitor.

18. A variable-capacitance type sensor comprising:

a planar electrode capacitor which has fixed and movable electrodes with surfaces thereof set to face each other and whose static capacitance varies according to a variation in a distance between the electrodes in a direction perpendicular to the electrodes; and a fixed constant-capacitance capacitor serially connected to the planar electrode capacitor;

wherein capacitance of the variable-capacitance type sensor, which varies according to a pressure applied thereto, is a resultant synthesized capacitance of the static capacitance of the planar electrode capacitor and a capacitance of the constant-capacitance capacitor, thus resulting in an improved output characteristic for the variable-capacitance type sensor.

\* \* \* \* \*